United States Patent
Ishizaki (10) Patent No.: US 12,405,366 B2
(45) Date of Patent: Sep. 2, 2025

(54) SENSOR NETWORK

(71) Applicant: HONDA MOTOR CO., LTD., Tokyo (JP)

(72) Inventor: Ryusuke Ishizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 262 days.

(21) Appl. No.: 18/039,767

(22) PCT Filed: Nov. 25, 2021

(86) PCT No.: PCT/JP2021/043151
§ 371 (c)(1),
(2) Date: Jun. 1, 2023

(87) PCT Pub. No.: WO2022/153679
PCT Pub. Date: Jul. 21, 2022

(65) Prior Publication Data
US 2024/0036191 A1  Feb. 1, 2024

(30) Foreign Application Priority Data

Jan. 14, 2021 (JP) .................................. 2021-004228

(51) Int. Cl.
*G01S 13/88* (2006.01)
(52) U.S. Cl.
CPC .................................... *G01S 13/88* (2013.01)
(58) Field of Classification Search
CPC ......... G01S 13/88; H04L 67/12; G08C 15/00; H04M 11/00; H04Q 9/00
See application file for complete search history.

(56) References Cited

U.S. PATENT DOCUMENTS

2018/0343550 A1* 11/2018 Murai ..................... H04W 4/38

FOREIGN PATENT DOCUMENTS

| DE | 202018105635 U1 | 10/2018 |
|---|---|---|
| JP | 2011-120385 A | 6/2011 |
| JP | 2014-068285 A | 4/2014 |
| JP | 2016-001425 A | 1/2016 |
| JP | 2019-021031 A | 2/2019 |
| JP | 2020-067925 A | 4/2020 |
| JP | 2020-092319 A | 6/2020 |
| WO | WO-2019176183 A1 * | 9/2019 |

OTHER PUBLICATIONS

Office Action dated Jun. 20, 2025 issued in the corresponding Chinese Patent Application No. 202180083892.4 with the English machine translation thereof.

* cited by examiner

*Primary Examiner* — Vladimir Magloire
*Assistant Examiner* — Bongani Jabulani Mashele
(74) *Attorney, Agent, or Firm* — Carrier, Shende & Associates P.C.; Joseph P. Carrier; Fulchand P. Shende

(57) ABSTRACT

In a case where first sensor data SD1 output from a proximity sensor S1 included in a sensor module Smod (i) indicates a first designated state, only first composite sensor data Dt1 including the first sensor data SD1 and a first flag F1 indicating the type of the proximity sensor S1 or the first designated state is transmitted from the sensor module Smod (i) to a central processing unit Smod (0) via a network. In this case, second composite sensor data Dt2 including second sensor data SD2 and a second flag F2 indicating the type of a contact force sensor S2 or the second designated state is not transmitted from the sensor module Smod (i) to the central processing unit Smod (0) via the network.

7 Claims, 9 Drawing Sheets

SENSOR NETWORK

TECHNICAL FIELD

The present invention relates to a sensor network including a plurality of sensor modules as components.

BACKGROUND ART

In a case where a plurality of sensors is arranged on a target object, the quantity of data output from the plurality of sensors increases in accordance with an increase in the number of sensors (e.g., refer to Patent Literature 1).

CITATION LIST

Patent Literature

Patent Literature 1: JP 2020-092319 A

SUMMARY OF INVENTION

Technical Problem

In a case where a combined type sensor including a proximity sensor for detecting a proximity state of a target object with respect to another object and a contact sensor for detecting a pressing force of the target object with respect to another object is dispersedly arranged on the target object, the quantity of data aggregated from the combined type sensor is significantly increased, and processing of the data may be hindered.

Therefore, an object of the present invention is to provide a sensor network that can achieve a reduction in the quantity of data that is transmitted from a plurality of sensors of different types, while also maintaining accuracy in estimating a state on the basis of sensor data that is output from the plurality of sensors.

Solution to Problem

A sensor network of the present invention includes a plurality of sensor modules and a central processing unit for processing data transmitted from each of the plurality of sensor modules via a network.

Each of the plurality of sensor modules includes
a plurality of sensors having different detection targets, and
a sensor data processing unit that determines whether or not each of a plurality of pieces of sensor data output from each of the plurality of sensors indicates each of a plurality of designated states on the basis of each of the plurality of pieces of sensor data, and causes a sensor data communication unit to transmit, to the central processing unit via the network, only composite sensor data including one piece of sensor data determined to indicate one designated state among the plurality of designated states and a flag for identifying a type of one sensor that has output the one piece of sensor data or for identifying the one designated state.

According to the sensor network having the above configuration, in a case where one sensor data output from one sensor among a plurality of sensors of different types included in a sensor module indicates one designated state, that is, in a case where usefulness of the one sensor data is high from a viewpoint of state estimation of an arrangement place (and/or the periphery thereof) of the sensor module, composite sensor data including the one sensor data and a flag indicating the type of the one sensor or the one designated state is transmitted from the sensor module to the central processing unit via a network.

On the other hand, in a case where the other sensor data output from the other sensor among the plurality of sensors of different types included in a sensor module does not indicate the other designated state, that is, in a case where usefulness of the other sensor data is low from a viewpoint of state estimation of an arrangement place (and/or the periphery thereof) of the sensor module, composite sensor data including the other sensor data and a flag indicating the type of the other sensor or the other designated state is not transmitted from the sensor module to the central processing unit via a network.

Therefore, it is possible to achieve a reduction in the quantity of data that is transmitted from the plurality of sensors of different types to the central processing unit via the network, while also maintaining accuracy in estimating the state of the arrangement place of the sensors on the basis of sensor data output from the plurality of sensors.

In the sensor network of the present invention,
the sensor data processing unit preferably determines whether or not the sensor data indicates the designated state according to whether at least one of time-series change amounts of the sensor data exceeds a threshold in addition to or instead of whether or not the sensor data is included in a designated range.

According to the sensor network having the above configuration, in a case where one sensor data output from one sensor among a plurality of sensors of different types included in a sensor module is included in a designated range and/or a time-series change amount thereof is equal to or more than a threshold, that is, in a case where usefulness of the one sensor data is high from the viewpoint of state estimation of a place where the sensor module is provided, composite sensor data including the one sensor data is transmitted from the sensor module to the central processing unit via the network.

On the other hand, in a case where sensor data output from another sensor among the plurality of sensors of different types included in the sensor module is out of the designated range and/or the time-series change amount thereof is less than a threshold, that is, in a case where the usefulness of the other sensor data is low from the viewpoint of state estimation of the place where the sensor module is provided, composite sensor data including the other sensor data is not transmitted from the sensor module to the central processing unit via the network.

Therefore, it is possible to achieve a reduction in the quantity of data that is transmitted from the plurality of sensors of different types to the central processing unit via the network, while also maintaining accuracy in estimating the state of the arrangement place of the sensors on the basis of sensor data output from the plurality of sensors.

In the sensor network of the present invention, the sensor data processing unit preferably determines, on the basis of each of the plurality of pieces of sensor data, whether or not each of the plurality of pieces of sensor data indicates each of a plurality of designated states that are not achieved simultaneously.

According to the sensor network having the above configuration, on the basis of each of the plurality of pieces of sensor data output from each of the plurality of sensors of different types included in the sensor module, it is not determined that the arrangement place of the sensor module is in one designated state and is also in another designated state simultaneously. Therefore, when composite sensor data including one sensor data is transmitted from the sensor module to the central processing unit via the network, composite sensor data including another sensor data is not transmitted from the sensor module to the central processing unit via the network. Therefore, it is possible to achieve a reduction in the quantity of data that is transmitted from the plurality of sensors of different types to the central processing unit via the network, while also maintaining accuracy in estimating the state of the arrangement place of the sensors on the basis of sensor data output from the plurality of sensors.

In the sensor network of the present invention,
the sensor data processing unit preferably determines whether or not the one sensor data indicates the one designated state on the basis of another sensor data output from another sensor among the plurality of sensors in addition to the one sensor data.

According to the sensor network having the above configuration, in each sensor module, in addition to one sensor data output from one sensor, another sensor data output from another sensor is considered, whereby whether or not the first sensor data represents the first designated state can be determined with higher accuracy. Therefore, it is possible to achieve a reduction in the quantity of data that is transmitted from the plurality of sensors of different types to the central processing unit via the network, while also maintaining accuracy in estimating the state of the arrangement place of the sensors on the basis of sensor data output from the plurality of sensors.

In the sensor network of the present invention,
each of the plurality of sensor modules preferably includes
a proximity sensor for detecting a proximity state with respect to a target object, as the one sensor, and
a contact force sensor for detecting presence or absence of contact with a target object and a magnitude of a contact force, as the other sensor.

According to the sensor network having the above configuration, it is possible to reduce the quantity of data transmitted from the proximity sensor and the contact force sensor included in each sensor module while maintaining the estimation accuracy of each of the proximity state and the contact state with respect to another object as the state of one object on the basis of the sensor data output from each of the proximity sensor and the contact force sensor.

In the sensor network of the present invention,
the sensor data processing unit preferably generates the composite sensor data including an arrangement factor indicating an arrangement of the sensor module.

According to the sensor network having the above configuration, on the basis of sensor data output from a plurality of sensors of different types, the estimation accuracy of a state at each of a plurality of positions in one object according to the arrangement mode of each sensor module is maintained. In addition, as described above, the quantity of data transmitted from the plurality of sensors can be reduced.

In the sensor network of the present invention,
the central processing unit preferably includes
a plurality of arithmetic processing units, and
a central data processing unit that identifies the type of the sensor or the designated state using the flag and transmits the composite sensor data to an arithmetic processing unit corresponding to the type of the sensor or the designated state, among the plurality of arithmetic processing units.

According to the sensor network having the above configuration, the composite sensor data is transmitted to the arithmetic processing unit for processing the sensor data included in the composite sensor data, among the plurality of arithmetic processing units included in the central processing unit. That is, composite sensor data that does not include sensor data to be processed by each arithmetic processing unit is not transmitted to the arithmetic processing unit. Therefore, as described above, while maintaining accuracy in estimating the state on the basis of the sensor data output from the plurality of sensors of different types, the quantity of data transmitted from the plurality of sensors is reduced, and further, the arithmetic processing load of each control unit forming the central processing unit is reduced.

DESCRIPTION OF EMBODIMENTS

Figure 1:
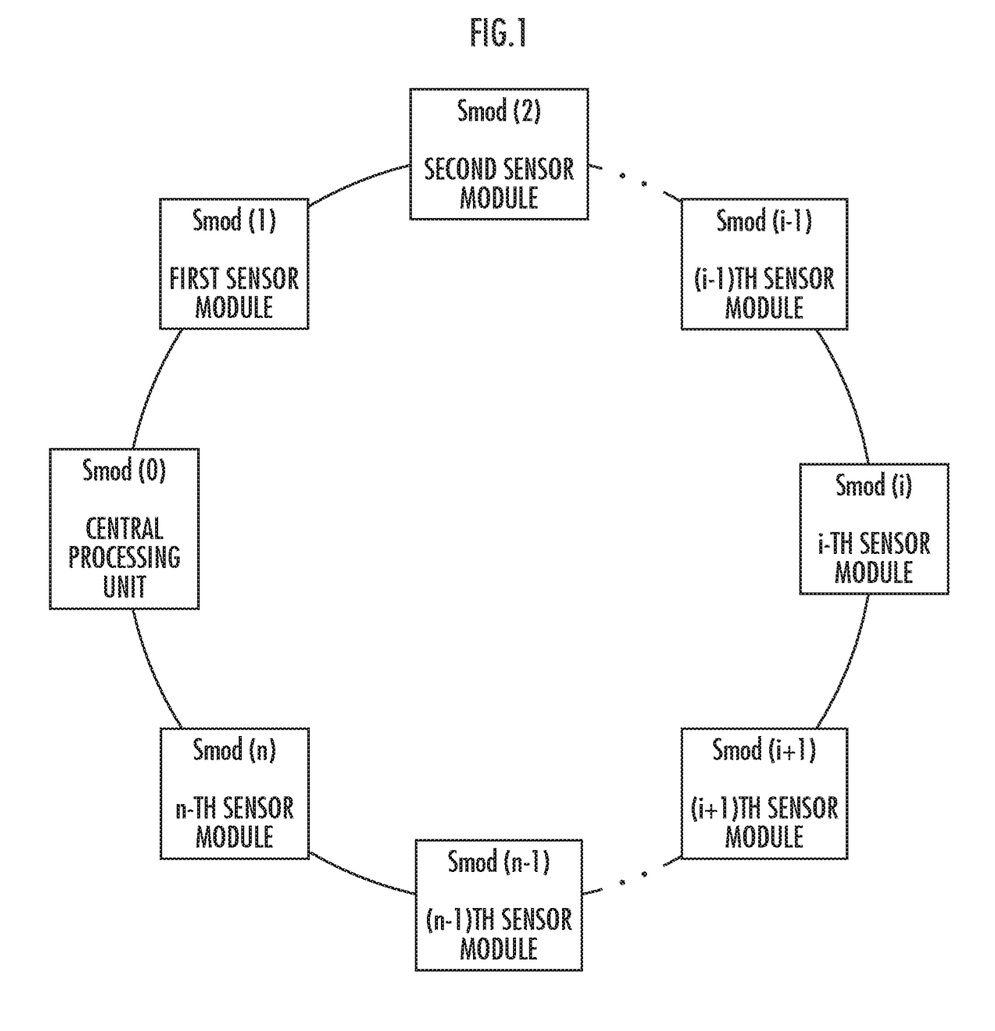
FIG. 1 is an explanatory diagram related to a configuration of a sensor network as an embodiment of the present invention.

A sensor network as an embodiment of the present invention illustrated in FIG. 1 includes a plurality of (n) sensor modules Smod (1) to Smod (n), and a central processing unit Smod (0) for processing data transmitted from each of the plurality of sensor modules Smod (1) to Smod (n) via a network.

As illustrated in FIG. 1, the sensor network as an embodiment of the present invention forms a ring network in which the central processing unit Smod (0), a first sensor module Smod (1), a second sensor module Smod (2), . . . an (i−1)th sensor module Smod (i−1), an i-th sensor module Smod (i), an (i+1)th sensor module Smod (i+1), . . . an (n−1) th sensor module Smod (n−1), and an n-th sensor module Smod (n) are connected in this order, and the n-th sensor module Smod (n) is connected to the central processing unit Smod (0).

The i-th sensor module Smod (i) (i=1, 2, . . . n) is dispersedly arranged, for example, in a plurality of positions of a plurality of fingers and the palm of a robot hand which is a control target.

Figure 2:
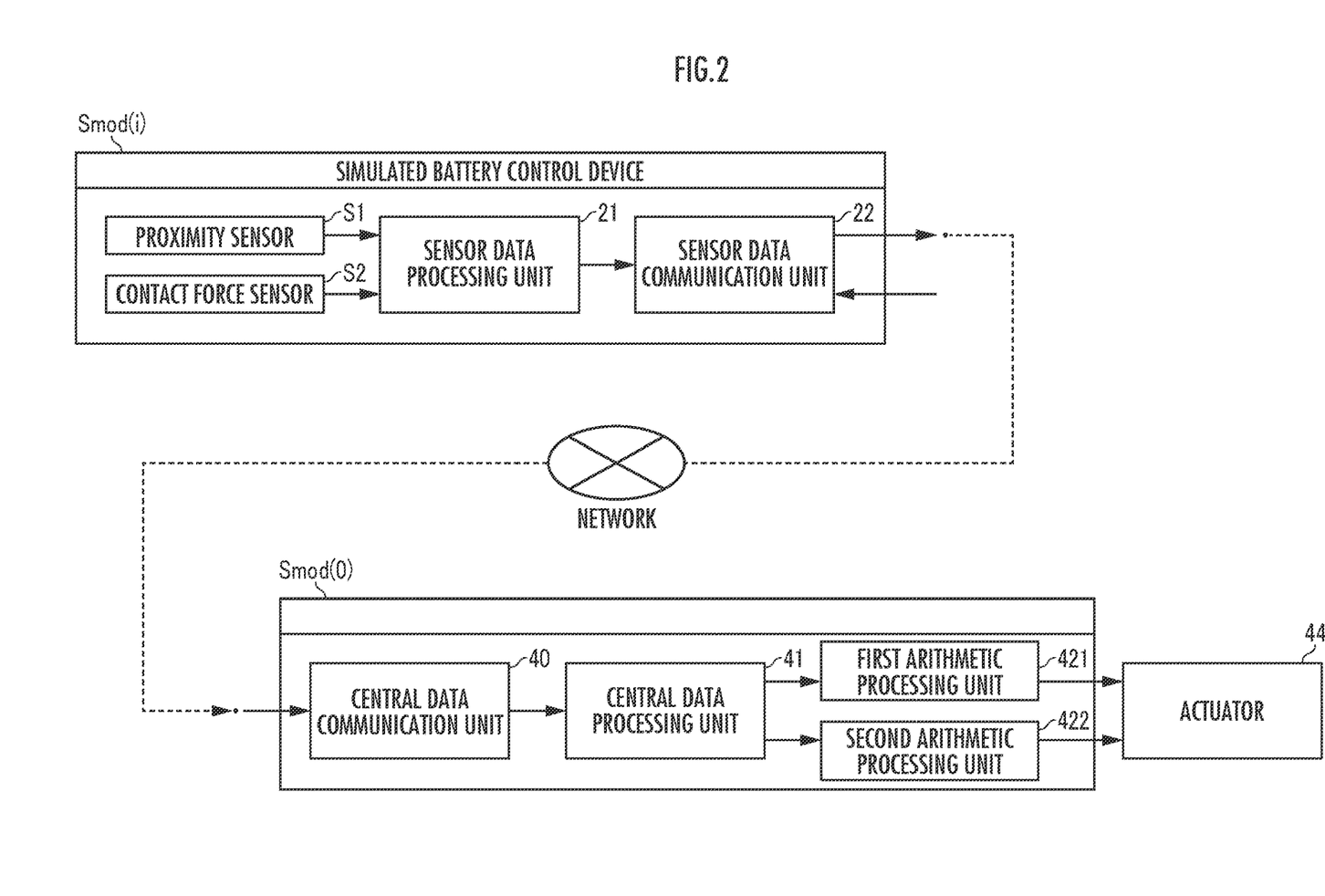
FIG. 2 is an explanatory diagram related to a configuration of a sensor module and a central processing unit.

As illustrated in FIG. 2, the central processing unit Smod (0) includes a central data communication unit 40, a central data processing unit 41, a first arithmetic processing unit 421, and a second arithmetic processing unit 422. The central processing unit Smod (0) and at least some of the components thereof include a storage device (memory such as ROM, RAM, and EEPROM, SSD, HDD, and the like) that stores and holds software and/or data, and an arithmetic processing device (single-core processor, multi-core processor, CPU, and the like) that reads necessary software and/or data from the storage device and executes arithmetic processing for the data.

The central data communication unit 40 is configured to transmit and receive data to and from the i-th sensor module Smod (i) (i=1, 2, . . . n) via a network. The central data processing unit 41 is configured to identify a type of sensor or a designated state by a flag included in composite sensor data (described later) received by the central data communication unit 40, and transmit the composite sensor data to an arithmetic processing unit corresponding to the type of sensor or the designated state among the first arithmetic processing unit 421 and the second arithmetic processing unit 422.

Each of the first arithmetic processing unit 421 and the second arithmetic processing unit 422 controls the operation of one or a plurality of actuators 44 included in the control target by transmitting a control command signal to the actuator 44. The control target is, for example, a robot hand having a palm and a plurality of fingers extending from the palm, and further, a robot arm having the robot hand as an end effector.

On the basis of first sensor data SD1 included in first composite sensor data Dt1 and indicating a proximity state between each of the plurality of positions in the robot hand which is the control target and an object, the first arithmetic processing unit 421 sets a grip position of the object by the plurality of fingers, and transmits a first control command signal to the actuator 44 so that the grip position of the plurality of fingers abuts on the object. On the basis of second sensor data SD2 included in second composite sensor data Dt2 and indicating a contact state between each of the plurality of positions in the robot hand which is the control target and the object, the second arithmetic processing unit 422 sets a force acting on the object from the plurality of fingers and/or the palm, and transmits a second control command signal to the actuator 44 so as to increase or decrease the force acting on the object from the plurality of fingers and/or the palm.

As illustrated in FIG. 2, the i-th sensor module Smod (i) includes a proximity sensor S1 (first sensor) for detecting a proximity state with respect to a target object, a contact force sensor S2 (second sensor) for detecting presence or absence of contact with the target object and pressure (reaction force received from object), a sensor data processing unit 21, and a sensor data communication unit 22.

The sensor data processing unit 21 illustrated in FIG. 2 includes a storage device (memory such as ROM, RAM, and EEPROM, SSD, HDD, and the like) that stores and holds software and/or data, and an arithmetic processing device (single-core processor, multi-core processor, CPU, and the like) that reads necessary software and/or data from the storage device and executes arithmetic processing for the data.

Each of the proximity sensor S1 and the contact force sensor S2 illustrated in FIG. 2 is, for example, a capacitive sensor, and the sensor data processing unit 21 determines the plurality of states on the basis of an electrostatic capacitance C1 measured by the proximity sensor S1 and an electrostatic capacitance C2 measured by the contact force sensor S2.

Table 1 collectively shows state determination results according to the measurement result of the electrostatic capacitance C1 of the proximity sensor S1 and the measurement result of the electrostatic capacitance C2 of the contact force sensor S2.

TABLE 1

| C1 | C2 | State |
|---|---|---|
| C1 = Cp | C2 = Cf | (1) No proximity or contact |
| Cp_min < C1 < Cp | C2 = Cf | (2) In proximity |
| C1 = Cp_min | C2 = Cf | (3) In contact |
| Cp_min < C1 < Cp | Cf < C2 | (4) Weak pressure |
| Cp < C1 | Cf < C2 | (5) Strong pressure |

On the basis of the first sensor data SD1 output from the proximity sensor S1, the sensor data processing unit 21 determines the states (1) to (3) as proximity states (first designated states) in which the arrangement place of the i-th sensor module Smod (i) is in proximity to the target object. On the basis of the second sensor data output from the contact force sensor S2, the sensor data SD2 processing unit 21 determines the states (4) to (5) as contact states (second designated states) in which the arrangement place of the i-th sensor module Smod (i) is in contact with or pressing against the target object.

Figure 3A:
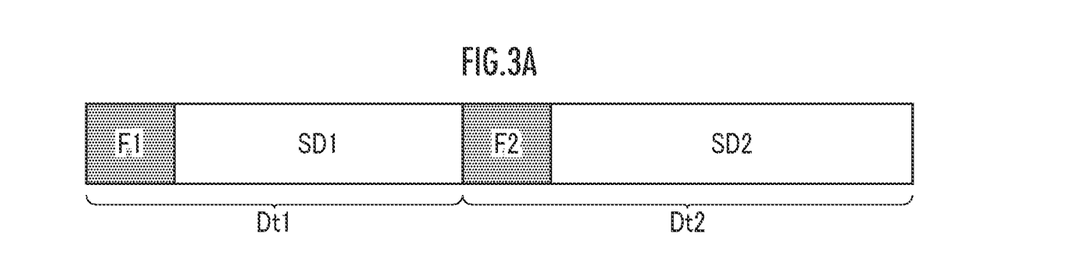
FIG. 3A is an explanatory diagram related to two pieces of composite sensor data.

As illustrated in FIG. 3A, the sensor data processing unit 21 has a function of generating each of the first composite sensor data Dt1 including the first sensor data SD1 output from the proximity sensor S1 and a first flag F1 indicating the type of the proximity sensor S1, and the second composite sensor data Dt2 including the second sensor data SD2 output from the contact force sensor S2 and a second flag F2 indicating the type of the contact force sensor S2.

Figure 3B:
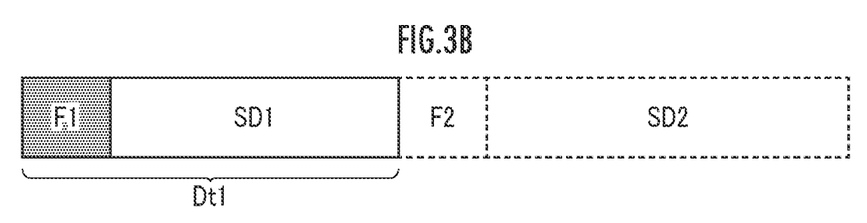
FIG. 3B is an explanatory diagram related to one piece of composite sensor data.

However, in a case where the sensor data processing unit 21 determines that the arrangement place of the i-th sensor module Smod (i) is in the proximity state (first designated state) of being in proximity to the target object, as illustrated in FIG. 3B, the sensor data processing unit 21 causes the sensor data communication unit 22 to transmit only the first composite sensor data Dt1 including the first sensor data SD1 and the first flag F1 for identifying the type of the proximity sensor S1 that has output the first sensor data SD1 or the first designated state to the central processing unit Smod (0) via the network. At this time, generation of the second composite sensor data Dt2 may be omitted.

Figure 3C:
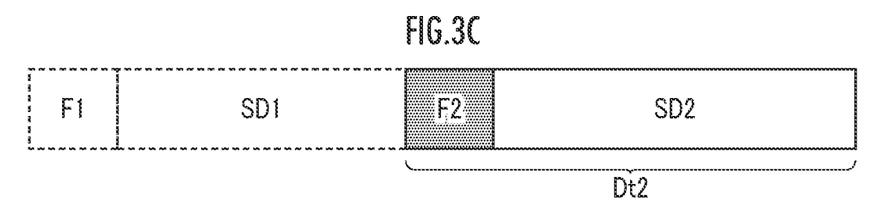
FIG. 3C is an explanatory diagram related to the other composite sensor data.

In addition, in a case where the sensor data processing unit 21 determines that the arrangement place of the i-th sensor module Smod (i) is in the contact state (second designated state) of being in contact with or pressing against the target object, as illustrated in FIG. 3C, the sensor data processing unit 21 causes the sensor data communication unit 22 to transmit only the second composite sensor data Dt2 including the second sensor data SD2 and the second flag F2 for identifying the type of the contact force sensor S2 that has output the second sensor data SD2 or the second designated state to the central processing unit Smod (0) via the network. At this time, generation of the first composite sensor data Dt1 may be omitted.

Figure 4A:
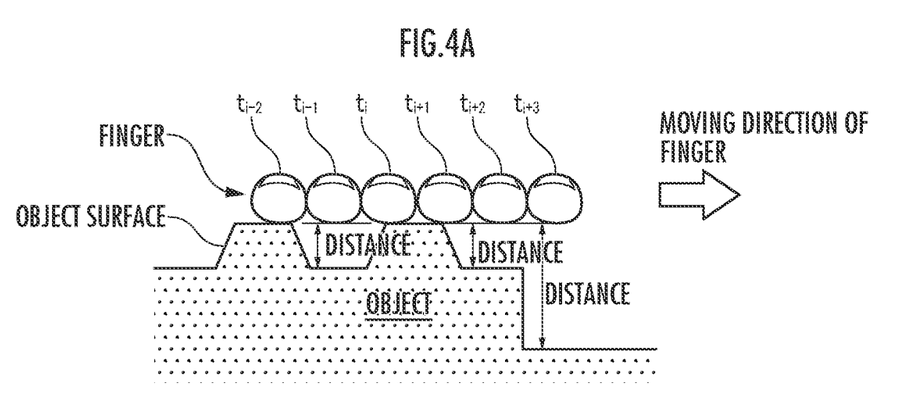
FIG. 4A is an explanatory diagram related to how a finger interacts with an object surface.

For example, as schematically illustrated in FIG. 4A, a case where one finger of the robot hand on which the sensor module Smod (i) is disposed is moved along an object surface having irregularities will be considered. Specifically, as illustrated in FIG. 4A, the state transitions in the order of a state where the finger is in contact with the object surface (time $t=t_{i-2}$), a state where the finger is in proximity to the object surface (time $t=t_{i-1}$), a state where the finger is in contact with the object surface (time $t=t_i$ and $t_{i+1}$), a state where the finger is in proximity to the object surface (time $t=t_{i+2}$), and a state where the finger is separated from the object surface (time $t=t_{i+3}$).

Figure 4B:
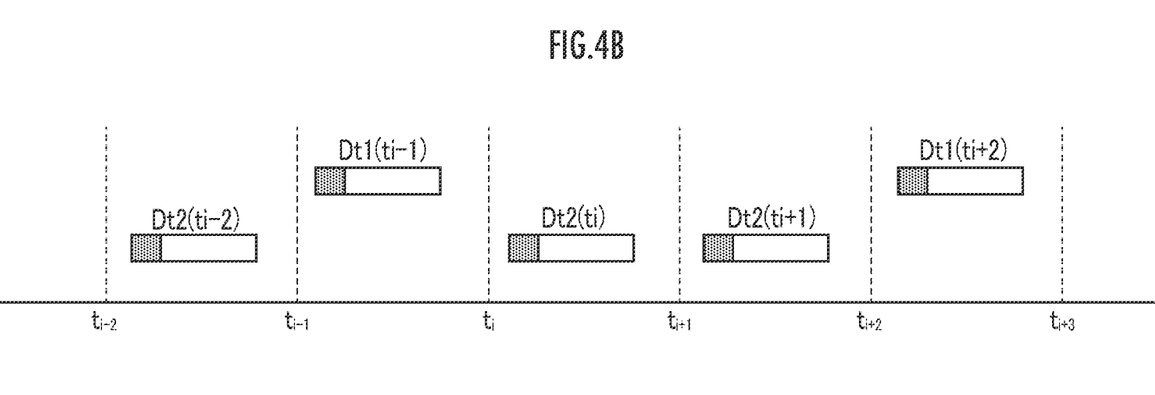
FIG. 4B is an explanatory diagram related to a transmission mode of composite sensor data from a sensor module arranged on a finger.

In this case, as schematically illustrated in FIG. 4B, second composite sensor data Dt2 ($t_{i-2}$), first composite sensor data Dt1 ($t_{i-1}$), second composite sensor data Dt2 ($t_i$), second composite sensor data Dt2 ($t_{i+1}$), and first composite sensor data Dt1 ($t_{i-2}$) are sequentially transmitted from the sensor module Smod (i) to the central processing unit Smod (0) according to the states at times $t=t_{i-2}$ to $t_{i+2}$. In addition, according to the state at time $t=t_{+3}$, neither the first composite sensor data Dt1 nor the second composite sensor data Dt2 is transmitted from the sensor module Smod (i) to the central processing unit Smod (0).

The sensor data communication unit 22 forming the i-th sensor module Smod (i) transmits and receives sensor data to and from the sensor data communication unit 22 forming the adjacent (i−1)th sensor module Smod (i−1) and/or (i+1)th sensor module Smod (i+1) via the network.

Sensor data transmitted from the i-th sensor module Smod (i) is transferred to the (i−2)th sensor module Smod (i−2) by the (i−1)th sensor module Smod (i−1). Then, the sensor data is transferred to the central processing unit Smod (0) in the order of the i-th sensor module Smod (i)→the (i−1)th sensor module Smod (i−1)→the (i−2)th sensor module Smod (i−2)→ . . . →the second sensor module Smod (2)→the first sensor module Smod (1)→the central processing unit Smod (0).

Conversely, sensor data transmitted from the i-th sensor module Smod (i) may be transferred to the (i+2)th sensor module Smod (i+2) by the (i+1)th sensor module Smod (i+1). Then, the sensor data may be transferred to the central processing unit Smod (0) in the order of the i-th sensor module Smod (i)→the (i+1)th sensor module Smod (i+1) →the (i+2)th sensor module Smod (i+2)→ . . . →the (n−1)th sensor module Smod (n−1)→the n-th sensor module Smod (n)→the central processing unit Smod (0).

Operation and Effects

According to the sensor network having the above configuration, in a case where the first sensor data SD1 output from the proximity sensor S1 included in the sensor module Smod (i) indicates the first designated state, that is, in a case where the usefulness of the first sensor data SD1 is high from the viewpoint of state estimation of the arrangement place (and/or the periphery thereof) of the sensor module Smod (i), only the first composite sensor data Dt1 including the first sensor data SD1 and the first flag F1 indicating the type of the proximity sensor S1 or the first designated state is transmitted from the sensor module Smod (i) to the central processing unit Smod (0) via the network (see FIGS. 3B and 4B (time $t=t_{1-1}$, $t_{i+2}$)).

In the present embodiment, since this case corresponds to a case where the second sensor data SD2 output from the contact force sensor S2 does not indicate the second designated state, the second composite sensor data Dt2 including the second sensor data SD2 and the second flag F2 indicating the type of the contact force sensor S2 or the second designated state is not transmitted from the sensor module Smod (i) to the central processing unit Smod (0) via the network (see FIGS. 3B and 4B (time $t=t_{i-1}$, $t_{i+2}$)).

On the other hand, in a case where the second sensor data SD2 output from the contact force sensor S2 included in the sensor module Smod (i) indicates the second designated state, that is, in a case where the usefulness of the second sensor data SD2 is high from the viewpoint of state estimation of the arrangement place (and/or the periphery thereof) of the sensor module Smod (i), only the second composite sensor data Dt2 including the second sensor data SD2 and the second flag F2 indicating the type of the contact force sensor S2 or the second designated state is transmitted from the sensor module Smod (i) to the central processing unit Smod (0) via the network (see FIGS. 3C and 4B (time $t=t_{i-2}$, ti, $t_{i+1}$)).

In the present embodiment, since this case corresponds to a case where the first sensor data SD1 output from the proximity sensor S1 does not indicate the first designated state, the first composite sensor data Dt1 including the first sensor data SD1 and the first flag F1 indicating the type of the proximity sensor S1 or the first designated state is not transmitted from the sensor module Smod (i) to the central processing unit Smod (0) via the network (see FIGS. 3C and 4B (time $t=t_{i-2}$, $t_i$, $t_{i+1}$)).

The sensor data processing unit 21 determines whether or not the first sensor data SD1 indicates the first designated state (proximity state) on the basis of the second sensor data SD2 in addition to the first sensor data SD1 (see states (2) and (4) in Table 1). As a result, whether or not the first sensor data SD1 indicates the first designated state can be determined with higher accuracy.

Therefore, it is possible to achieve a reduction in the quantity of data that is transmitted from the plurality of sensors S1 and S2 of different types to the central processing unit Smod (0) via the network, while also maintaining accuracy in estimating the state of the arrangement place of the sensor module Smod (i) including the sensors S1 and S2 on the basis of sensor data output from the plurality of sensors S1 and S2.

Composite sensor data is transmitted to the first arithmetic processing unit 421 and the second arithmetic processing unit 422 for processing the sensor data SD1 and SD2 included in the composite sensor data Dt1 and Dt2, among the plurality of arithmetic processing units included in the central processing unit Smod (0). That is, the composite sensor data that does not include sensor data to be processed by each of the arithmetic processing units 421 and 422 is not transmitted to the arithmetic processing unit. Therefore, as described above, while maintaining accuracy in estimating the state on the basis of the sensor data SD1 and SD2 output from the plurality of sensors S1 and S2 of different types, the quantity of data transmitted from the plurality of sensor modules Smod (i) is reduced, and further, the arithmetic processing load of each of the arithmetic processing units 421 and 422 forming the central processing unit Smod (0) is reduced.

Other Embodiment of Present Invention

In the above embodiment, the sensor network is configured by the ring network illustrated in FIG. 1, but as another embodiment, the sensor network may be configured by various different ring networks.

Figure 5:
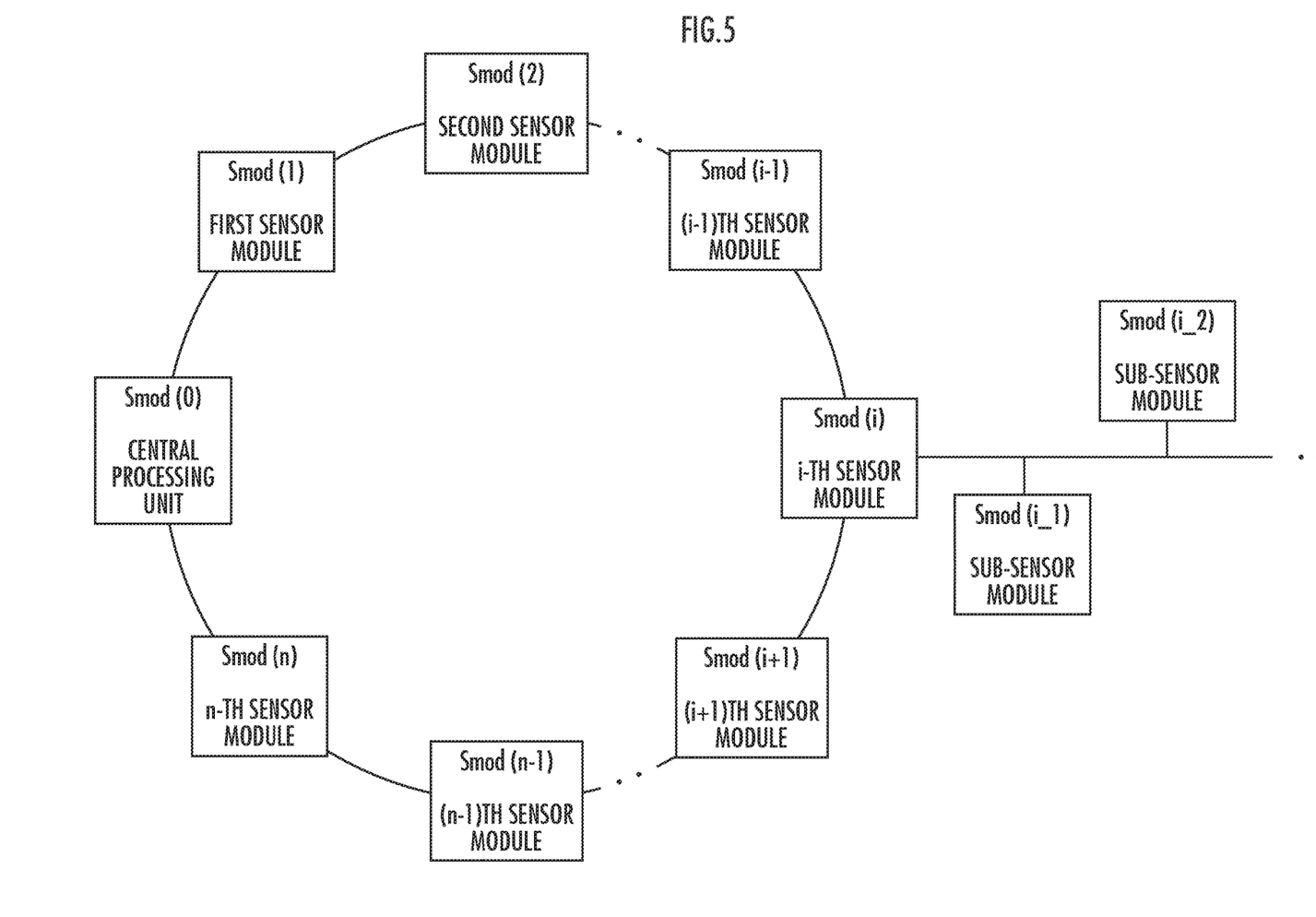
FIG. 5 is an explanatory diagram related to a configuration of a sensor network as another embodiment of the present invention.

For example, as illustrated in FIG. 5, a sensor network may be configured by a subnetwork in which a plurality of sub-sensor modules Smod (i_1), Smod (i_2), . . . are connected to branch ends and extend in a branch shape with an i-th sensor module Smod (i) forming a ring network as a base point.

Figure 6:
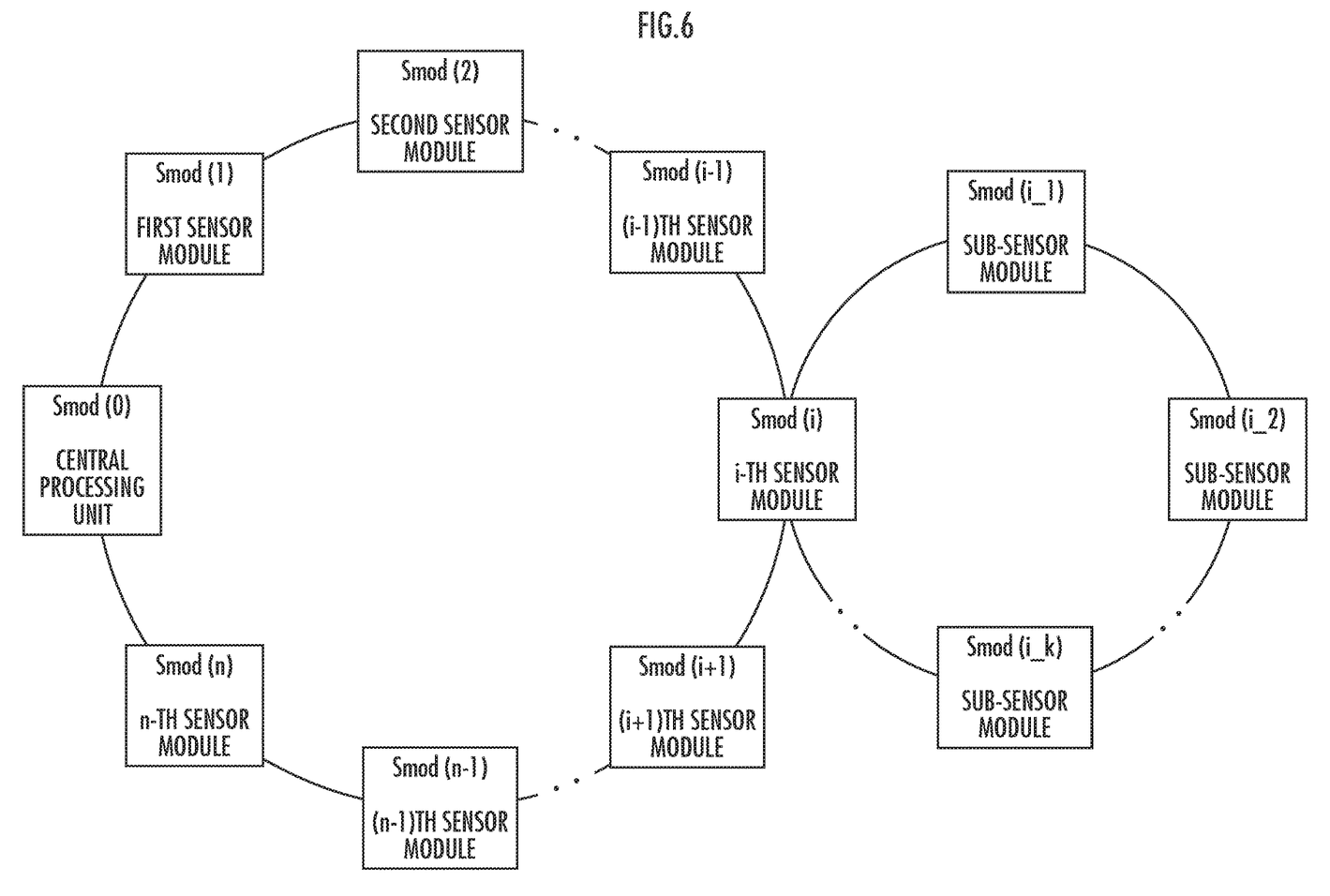
FIG. 6 is an explanatory diagram related to a configuration of a sensor network as another embodiment of the present invention.

As illustrated in FIG. 6, a sensor network may be configured by a subnetwork in which a plurality of sub-sensor modules Smod (i_1), Smod (i_2), . . . are sequentially connected and extend in a ring shape with an i-th sensor module Smod (i) forming a ring network as a base point. In this case, the i-th sensor module Smod (i) may have functions of central processing units of the plurality of sub-sensor modules Smod (i_1), Smod (i_2), . . . .

In the above embodiment, the sensor module Smod (i) includes the proximity sensor S1 and the contact force sensor S2, but may additionally or alternatively include various sensors for detecting different physical quantities and different designated states, such as a visual sensor, a radiation dose sensor, a magnetic sensor, an olfactory sensor, and/or a taste sensor, as a plurality of sensors of different types.

In the above embodiment, the first designated state (see states (1) to (3) in Table 1) and the second designated state (see states (4) and (5) in Table 1) are defined as states that are not achieved simultaneously. However, as another embodiment, the first designated state and the second designated state may be defined as states that are achieved simultaneously (see state (3) in Table 1). As described above, in a case where the sensor module Smod (i) includes a plurality of sensors of different types for detecting different physical quantities and different designated states, a plurality of designated states determined on the basis of a plurality of pieces of sensor data output from the plurality of sensors can be defined as states that are achieved simultaneously.

In the above embodiment, whether or not the first sensor data SD1 indicates the first designated state is determined on the basis of the second sensor data SD2 in addition to the first sensor data SD1 (see states (2) and (4) in Table 1). Meanwhile, as described above, in a case where the sensor module Smod (i) includes a plurality of sensors of different types for detecting different physical quantities and different designated states, each designated state can be determined on the basis of each sensor data output from each of the plurality of sensors.

In the above embodiment, the sensor data processing unit 21 determines whether or not the first sensor data SD1 indicates the first designated state (proximity state) according to whether or not the first sensor data SD1 (electrostatic capacitance C1) is included in a designated range (Cp_min≤C1<Cp) (see Table 1). Alternatively or in addition, it may be determined whether or not the first sensor data SD1 indicates the first designated state (proximity state or state in which change amount of interval with object is large) according to whether the time-series change amount of the first sensor data SD1 exceeds a threshold.

In the above embodiment, the sensor data processing unit 21 determines whether or not the second sensor data SD2 indicates the second designated state (contact state) according to whether or not the second sensor data SD2 (electrostatic capacitance C2) is equal to or more than a reference value Cf (whether or not second sensor data SD2 is included in designated range (Cf<C2)). Alternatively or in addition, it may be determined whether or not the second sensor data SD2 indicates the second designated state (contact state or state in which the change in acting force received from object is large) according to whether the time-series change amount of the second sensor data SD2 exceeds a threshold.

According to the sensor network having the above configuration, in each sensor module, in addition to one sensor data output from one sensor, another sensor data output from another sensor is considered, whereby whether or not the first sensor data represents the first designated state can be determined with higher accuracy. Therefore, it is possible to achieve a reduction in the quantity of data that is transmitted from the plurality of sensors of different types to the central processing unit via the network, while also maintaining accuracy in estimating the state of the arrangement place of the sensors on the basis of sensor data output from the plurality of sensors.

The sensor data processing unit 21 may generate composite sensor data Dt including an arrangement factor indicating the arrangement of the sensor module Smod (i). In this case, on the basis of sensor data SD output from the plurality of sensors S1 and S2 of different types, the estimation accuracy of the state at each of the plurality of positions in one object according to the arrangement mode of each sensor module Smod (i) is maintained.

REFERENCE SIGNS LIST

10 Base material
21 Sensor data processing unit
22 Sensor data communication unit
40 Central data communication unit
41 Central data processing unit
421 First arithmetic processing unit
422 Second arithmetic processing unit
S1 Proximity sensor (first sensor)
S2 Contact force sensor (second sensor)
Smod(0) Central processing unit
Smod(i) Sensor module

The invention claimed is:

1. A sensor network comprising a plurality of sensor modules and a central processing unit for processing data transmitted from each of the plurality of sensor modules via a network, wherein
each of the plurality of sensor modules includes
a plurality of sensors having different detection targets, and
a sensor data processing unit that determines whether or not each of a plurality of pieces of sensor data output from each of the plurality of sensors indicates each of a plurality of designated states on the basis of each of the plurality of pieces of sensor data, and causes a sensor data communication unit to transmit, to the central processing unit via the network, only composite sensor data including one piece of sensor data determined to indicate one designated state among the plurality of designated states and a flag for identifying a type of one sensor that has output the one piece of sensor data or for identifying the one designated state.

2. The sensor network according to claim 1, wherein
the sensor data processing unit determines whether or not the sensor data indicates the designated state according to whether at least one of time-series change amounts of the sensor data exceeds a threshold in addition to or instead of whether or not the sensor data is included in a designated range.

3. The sensor network according to claim 1, wherein
the sensor data processing unit determines, on the basis of each of the plurality of pieces of sensor data, whether or not each of the plurality of pieces of sensor data indicates each of the plurality of designated states that are not achieved simultaneously.

4. The sensor network according to claim 1, wherein
the sensor data processing unit determines whether or not the one sensor data indicates the one designated state on the basis of another sensor data output from another sensor among the plurality of sensors in addition to the one sensor data.

5. The sensor network according to claim 4, wherein
each of the plurality of sensor modules includes a proximity sensor for detecting a proximity state with respect to a target object, as the one sensor, and a contact force sensor for detecting presence or absence of contact with a target object and a magnitude of a contact force, as the other sensor.

6. The sensor network according to claim 1, wherein the sensor data processing unit generates the composite sensor data including an arrangement factor indicating an arrangement of the sensor module.

7. The sensor network according to claim 1, wherein the central processing unit includes a plurality of arithmetic processing units, and a central data processing unit that identifies the type of the sensor or the designated state using the flag and transmits the composite sensor data to an arithmetic processing unit corresponding to the type of the sensor or the designated state, among the plurality of arithmetic processing units.

* * * * *